Nov. 9, 1943.    W. J. CONLEY    2,334,070
AIRCRAFT
Filed April 25, 1942    8 Sheets-Sheet 1

INVENTOR
William J. Conley
BY Bartlett, Eyre, Keel & Weymouth
ATTORNEYS

Nov. 9, 1943.　　　　W. J. CONLEY　　　　2,334,070
AIRCRAFT
Filed April 25, 1942　　　8 Sheets-Sheet 2

INVENTOR
WILLIAM J. CONLEY
BY
ATTORNEYS

Nov. 9, 1943.   W. J. CONLEY   2,334,070
AIRCRAFT
Filed April 25, 1942   8 Sheets-Sheet 3
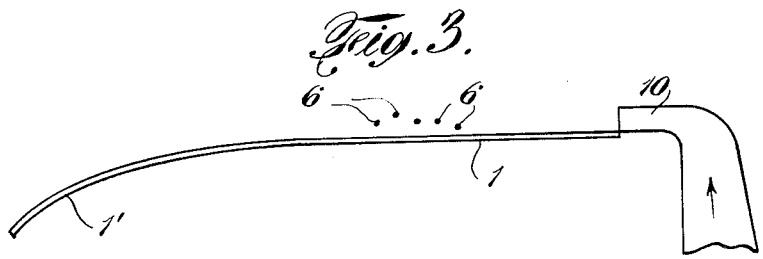
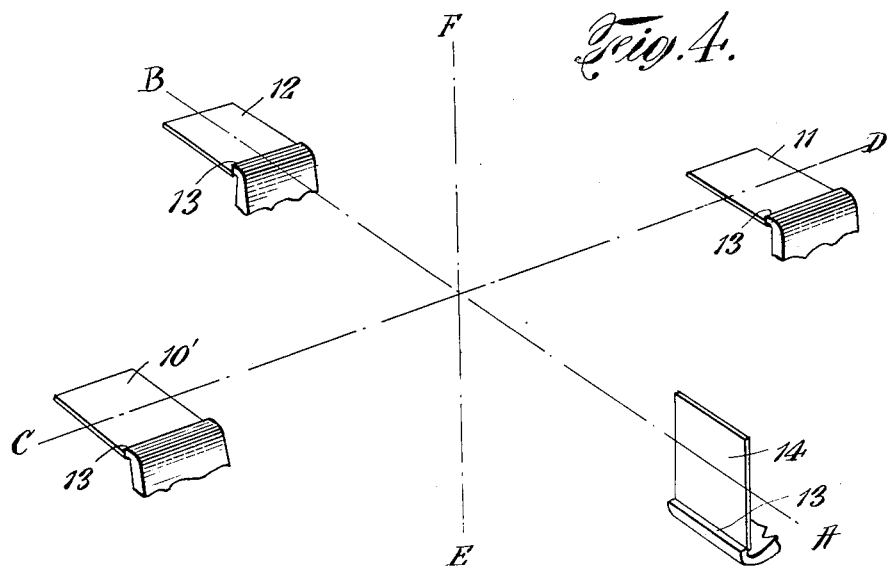
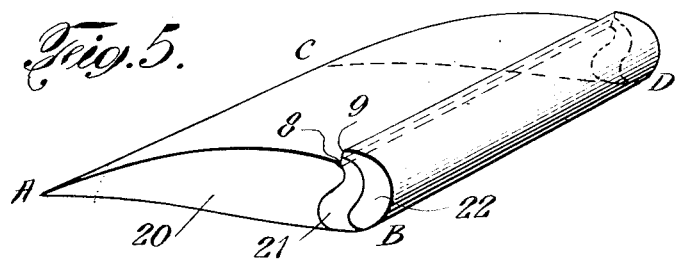
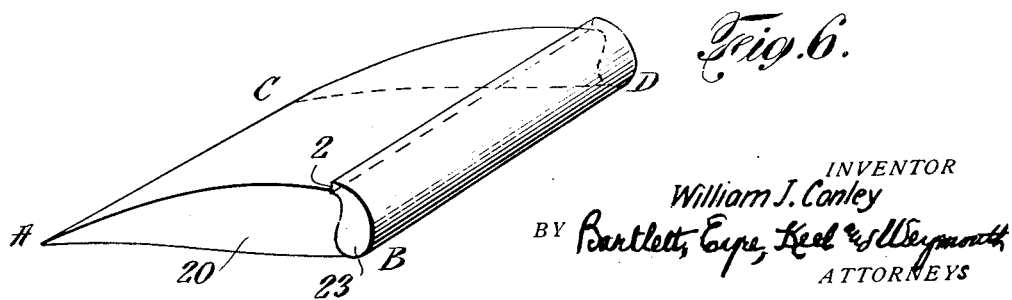
INVENTOR
William J. Conley
BY Bartlett, Eyre, Keel & Weymouth
ATTORNEYS

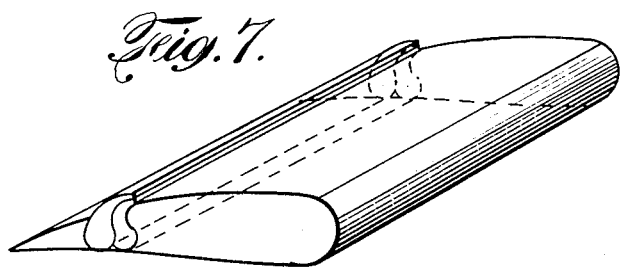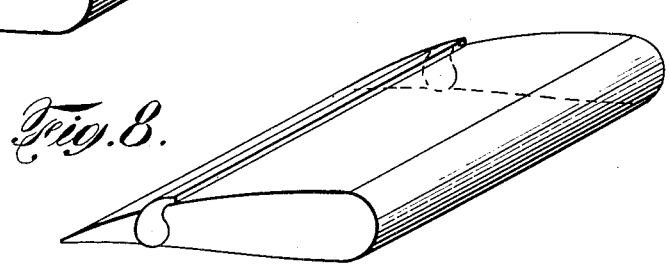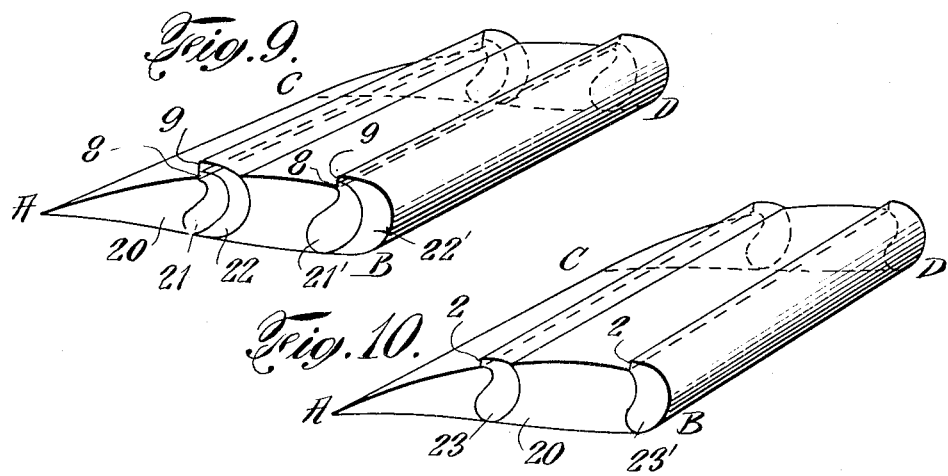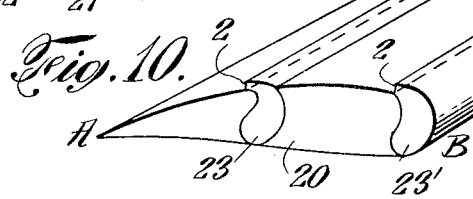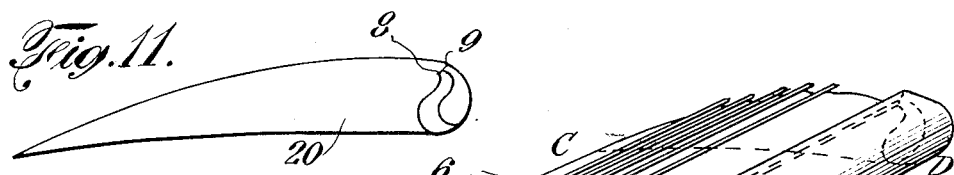

Nov. 9, 1943.    W. J. CONLEY    2,334,070
AIRCRAFT
Filed April 25, 1942    8 Sheets-Sheet 5
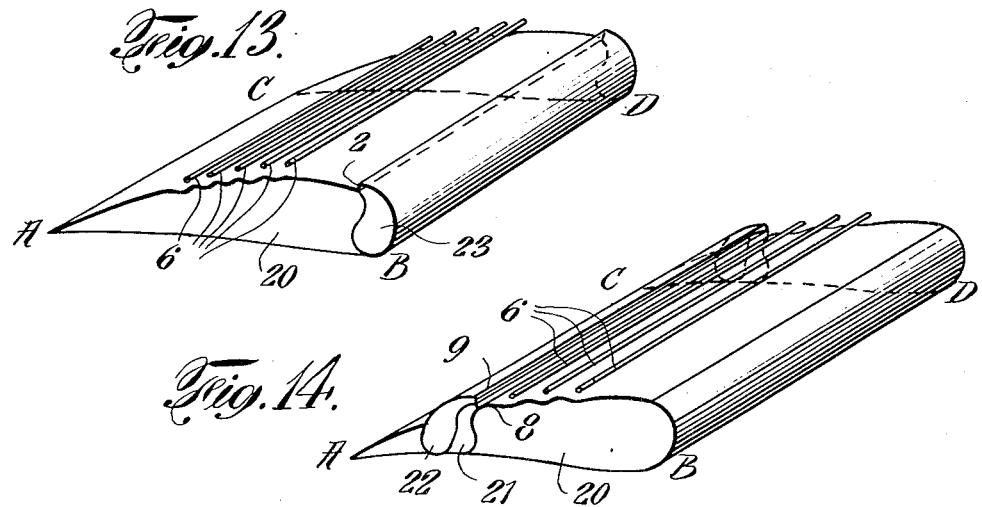
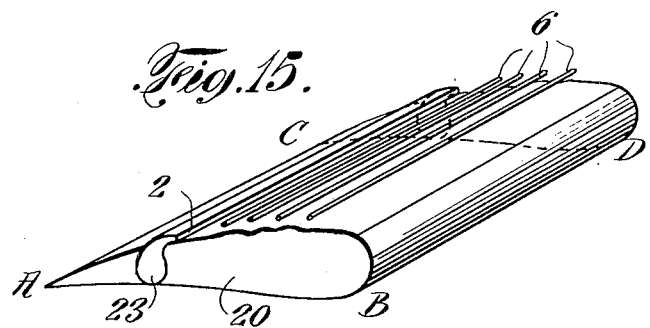
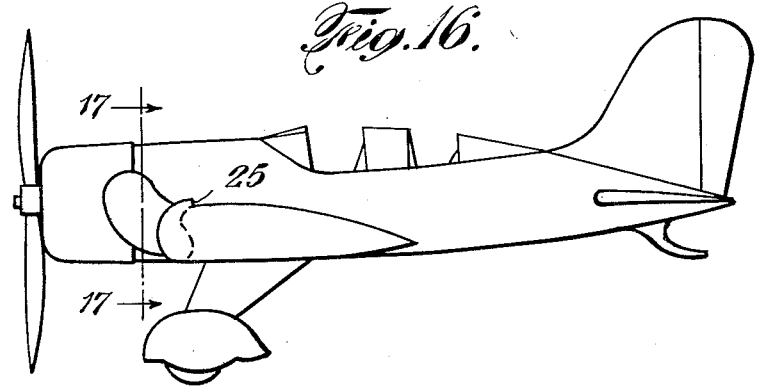
INVENTOR
William J. Conley
BY Bartlett, Eyre, Keel & Weymouth
ATTORNEYS

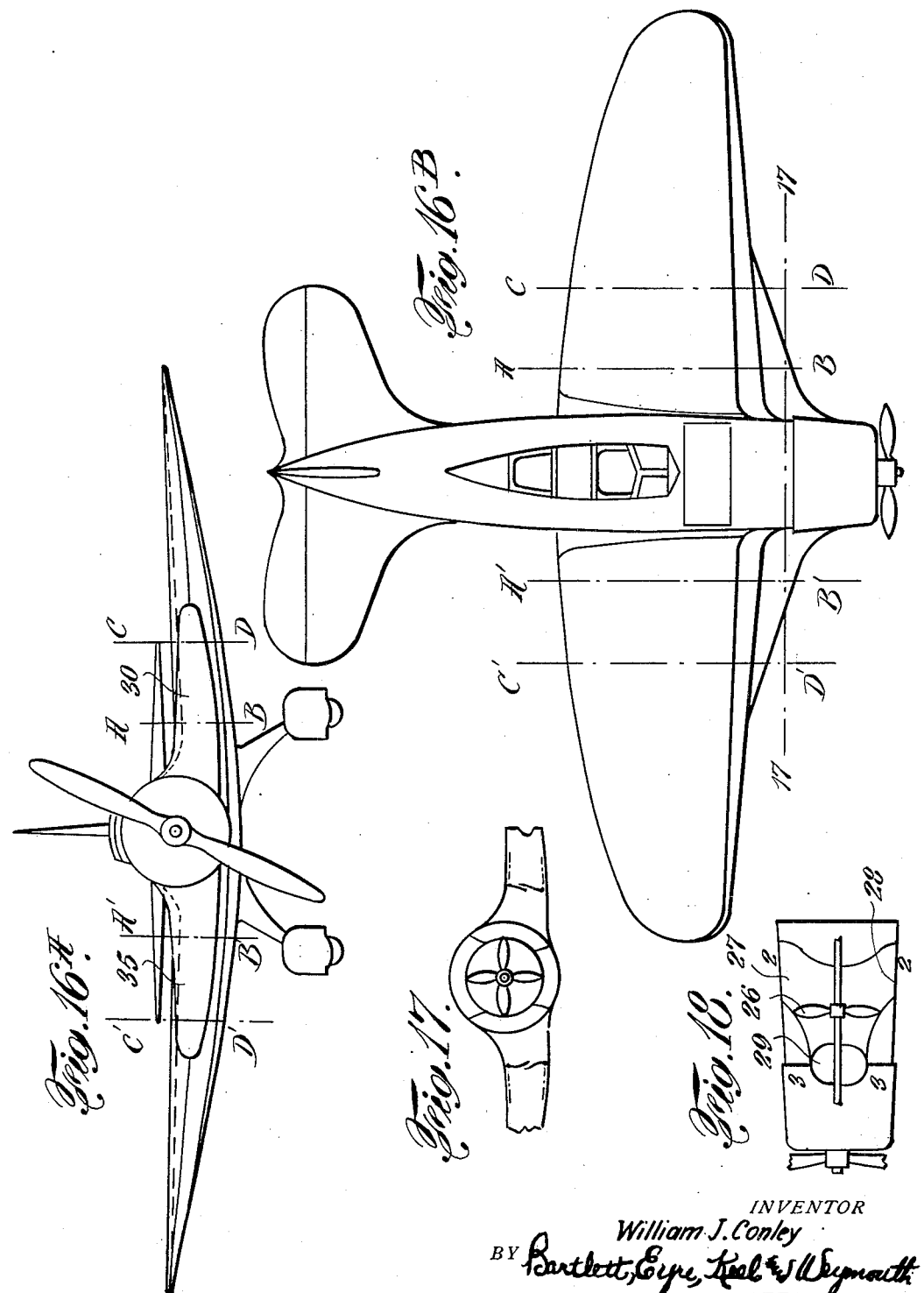

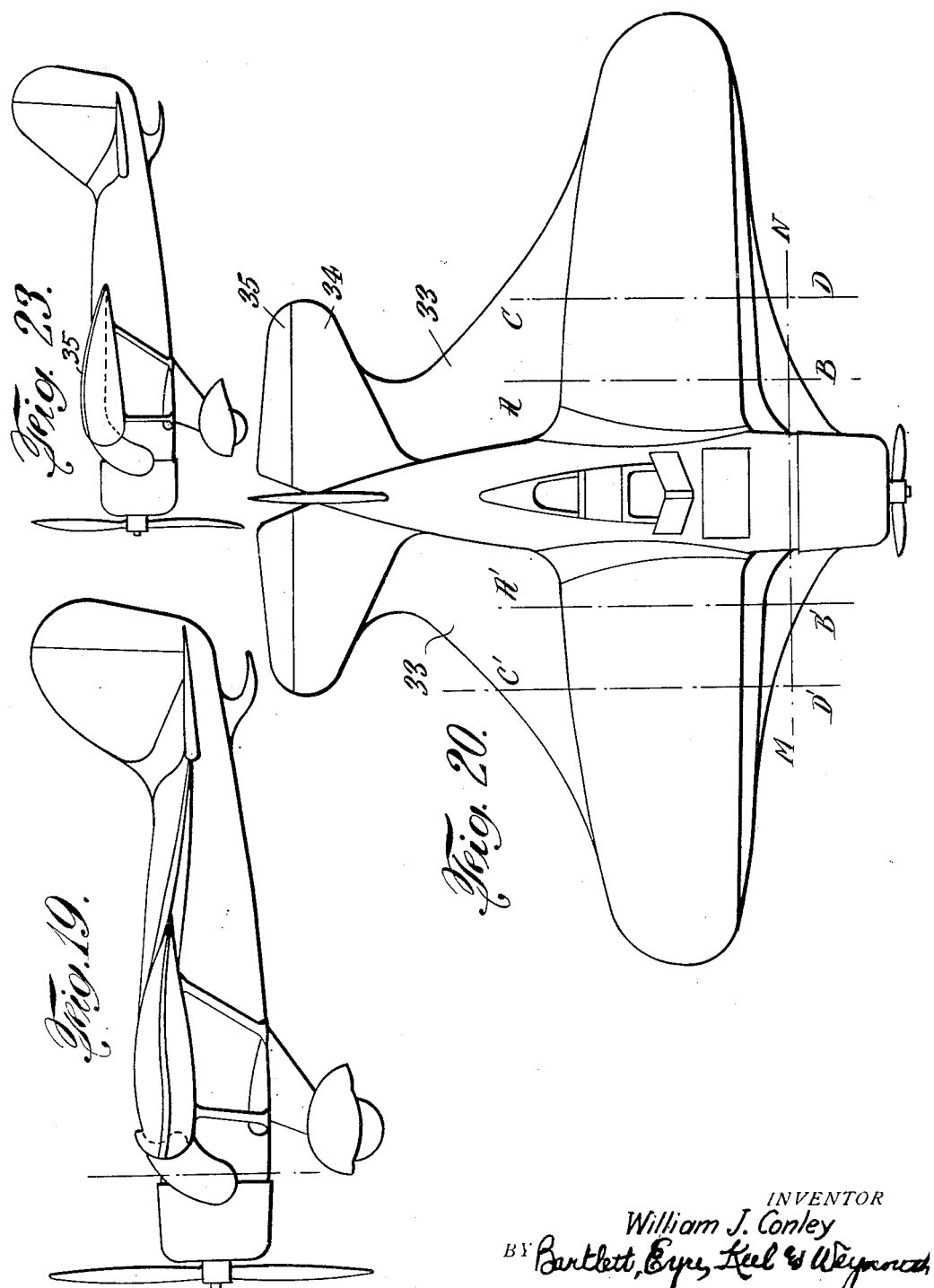

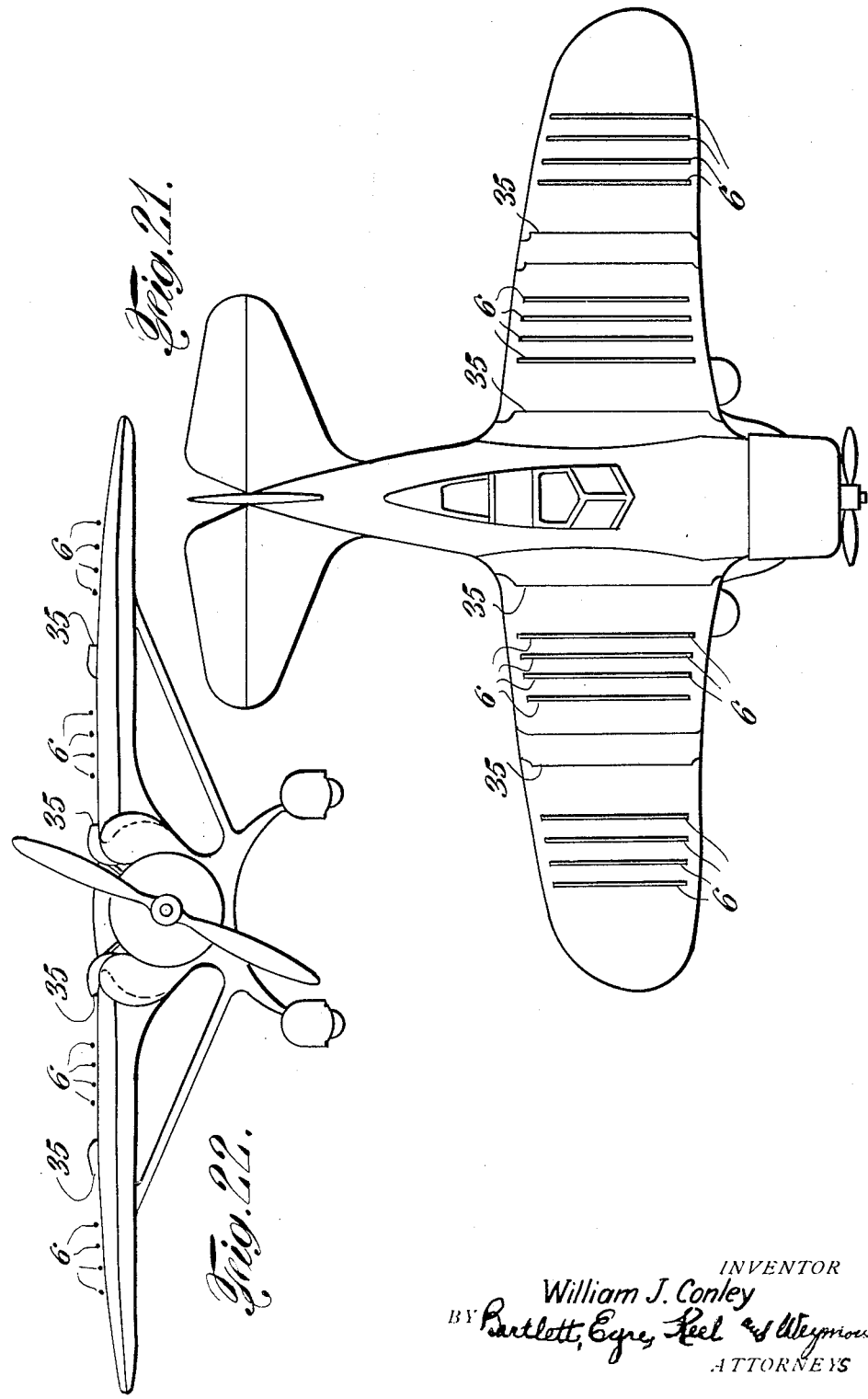

Patented Nov. 9, 1943

2,334,070

UNITED STATES PATENT OFFICE 2,334,070

AIRCRAFT

William J. Conley, Rochester, N. Y.

Application April 25, 1942, Serial No. 440,460

10 Claims. (Cl. 244—40)

This is a continuation in part of my application Serial No. 375,381, filed January 22, 1941.

This invention relates to aircraft.

One object of the invention is an aircraft wherein the aerodynamic lift may be independent of the translational or relative air speed and particularly a craft wherein such lift is under the control of the pilot at all times.

A further object of the invention is a heavier-than-air craft which is capable of efficient operation over a long range of air speeds.

A further object of the invention is a heavier-than-air craft which can ascend from and alight upon restricted areas under perfect control of the pilot at all times.

A further object of the invention is a control for lighter-than-air and heavier-than-air craft whereby the craft is under efficient and perfect control at all times regardless of the translational or relative air speeds.

A further object of the invention is a novel means for creating aerodynamic lift in aircraft.

A further object of the invention is a novel lifting surface whose characteristics are under the control of the pilot.

It has heretofore been proposed to create lift on aerofoil surfaces by the utilization of artificial blowing means and air directing jets or nozzles. It has also been proposed to control and regulate the flow upon an aerofoil surface in relatively moving air by the use of auxiliary aerofoil or air directing surfaces in correlation with the main surfaces. According to my invention I obtain special aerodynamic effects and lifts by means of an air stream or film of air caused to flow relatively to the surface of the aerofoil and this air stream or film may be either artificially produced on the craft or obtained from the relatively moving air; and I accomplish the object of the invention by a novel character of flow or by a novel control and modification of this air stream or film or by a special correlation of the same with respect to the aerofoil.

For a better understanding of the invention reference may be had to the accompanying drawings forming a part of this application wherein:

Figs. 1, 1A, 1B, 1C, 1D, 1E, 1F, 2, 2A, 2B, 3 and 4 are diagrammatic views indicating the principle of the invention;

Figs. 5 to 15 are diagrammatic views indicating the application of certain features of my invention to conventional aerofoils;

Figs. 16, 16A, 16B, 17 and 18 are diagrammatic views showing the application of certain features of the invention to low wing monoplanes;

Figs. 19 and 20 show the application of certain features to high wing monoplanes; and Figs. 21, 22 and 23 show another application of the principle of the invention to high wing monoplanes.

Figure 1:
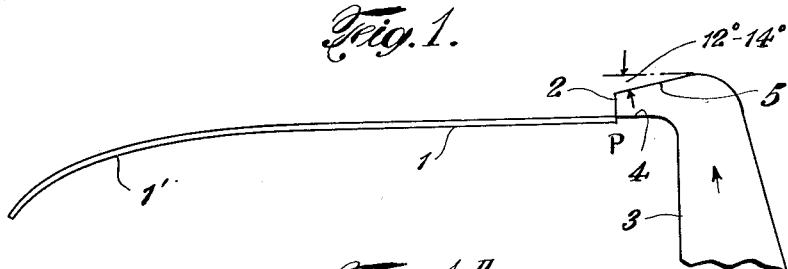

In Fig. 1, I have shown a surface 1 in diagrammatic manner and for purposes of illustration I have indicated this aerofoil 1 as having substantially no depth. It may have a straight part on one edge and a curved part 1' on the other edge or it may have a surface approaching a plane surface throughout its length or having any other desired curvature.

The air stream or film, which is caused to flow relatively to the aerofoil surface 1, issues through a nozzle 2 co-extensive in width with the area of the aerofoil surface which is to be subjected to the influence of this air stream or film. The air may be artificially created by a blower (not illustrated) or it may be air taken from any other suitable sources such as the relatively moving air. A channel or duct 3 is illustrated for leading the air supply from the source to the nozzle 2. In the particular embodiment of Fig. 1, I rely upon the velocity and volume of air issuing from the nozzle 2, and also upon the convergency of the nozzle 2, to obtain the aerodynamic effects which I obtain. This convergency of the nozzle 2 is effected by a substantially straight or plane surface or bottom wall 4 and an upper converging substantially plane surface or wall 5. I have found that this convergency of the nozzle 2 results in a substantially greater aerodynamic lift or effects upon the surface 1 than is obtained with the ordinary or straight nozzle. For example, with an air velocity of as low as 30 miles per hour as the air issues from the nozzle 2 and with a convergency of from 12 to 14 degrees, as indicated in Fig. 1, and with a nozzle depth at at the tip of approximately ⅜ of an inch, I find that the lift upon the aerofoil surface 1 is very substantially larger than the lift imparted to the surface 1 with an ordinary straight nozzle or no convergency and with the same air velocity and volume.

I have found that the efficiency of the lift due to the relative motion of a jet or film of air applied generally as shown in Fig. 1 is particularly marked when this jet is directed with respect to the surface of the aerofoil at a critical angle or critical angle range. For example, the lift drops off appreciably as the angle is decreased from or increased above an angle of about 13° or the range of 12° to 14°, but while best results are obtained at angles between 12° and 14°, fairly good results are obtained at angles as low as 10° and as high as 16°. If the aerofoil surface is curved at the point or points of issuance of the air flow, the latter should be directed in a direction with respect to the aerofoil surface such that the direction of the flow makes an angle with the surface at the point of contact, that is, at the point of issuance from the nozzle, within this range of angularity, namely with respect to the tangent of the surface at the point of issuance of the air stream. For example, referring to Fig. 1—C, the nozzle is so positioned with respect to the aerofoil surface shown as to cause the air stream to issue from the same in the direction B—A. The tangent to the aerofoil surface at the point B is indicated at C—B, B being the point of issuance of the flow from the nozzle or the point of contact with the aerofoil surface at the emergence of the flow from the nozzle. With the angle alpha formed between the lines A—B and C—B roughly at 13° and a jet velocity of from 40 to 50 miles per hour, I have found a marked increase in lift as compared with flows issuing in parallel relation to the surface or with flows issuing at a substantially greater or lesser angle than 13°. As indicated above, a substantial lift has been obtained at angles anywhere within the range 10° to 16° and particularly good results are obtained with angles of from 12° to 14°. These results were obtained with the use of a converging nozzle of the general character illustrated and having $\frac{3}{32}$ of an inch depth at the mouth or exit. It is understood, however, that nozzles of greater depth may or should be used where larger volumes of air are to be supplied to the aerofoil surface and the nozzle depth would also be governed to some extent by the velocity of the flow. In Fig. 1—D I have illustrated employment of the invention with an aerofoil having a substantially flat upper surface with the flow issuing from the nozzle in the direction of B—A, similarly as shown in Fig. 1—C.

I have found that a nozzle converging at an angle from 12° to 14° gives the most efficient results with a given set-up as regards availability of power to produce the quantity of air desired and at the velocity desired. With the critical angle of issuance of the air flow observed, this convergency of the nozzle may be departed from. For example, it may be decreased to zero convergence. In Fig. 1—E is shown the employment of a straight or non-converging nozzle H for supplying a film or flow of air to the conventional aerofoil similar to the aerofoil of Fig. 1—C. In Fig. 1—F is illustrated a similar nozzle H supplying an aerofoil having a substantially flat upper surface B—C.

I have found also that the aerodynamic characteristics of the aerofoil surface I with the air stream or film flowing therealong, as described above, may be varied and controlled at the will of the pilot by grouping wires or rods in the path of such air stream. In Figs. 1—A and 1—B I have shown two instances of such grouping of the wires or rods.

Referring to Fig. 1—A above the aerofoil I are located a series of wires or rods 6 disposed generally parallel to the upper surface of the aerofoil I and generally parallel to the exit of the nozzle 2. These wires or rods 3 are, of course, supported from or with the aerofoil I in any suitable manner so as to bear a fixed spaced relation with respect to each other and the aerofoil I, that is, fixed while in the operative position. These wires or rods may be disposed either longitudinally or transversely of or at an angle to the direction of flight and with a corresponding disposition of the nozzles to supply air streams across the wires. The longitudinal disposition of the wires minimizes the resistance or drag and facilitates the distribution from the nozzles, etc. The positioning of these wires or rods ahead of the air directing nozzle 2 substantially affects the aerodynamic effects upon the areofoil I, some relative arrangements producing a negative lift and other relative arrangements producing a positive lift with the same identically controlled directed air flow through the nozzle 2. Accordingly, the pilot by regulating the relative position of the wires or rods 3 and the aerofoil and by regulating the flow through the nozzle 2 may obtain varying aerodynamic lifts upon the aerofoil I. By an aerofoil construction and arrangement of this character the pilot may obtain the necessary lift for slow landing speeds or the required lift for transporting greater wing loadings. Moreover, with the proper correlation of the aerofoil surface and means for controlling and directing the air flow, an aircraft may be caused to hover or to stand practically still in still air and may be caused to ascend and descent at steep angles.

In an arrangement according to Fig. 1—A and with the lateral spacing of the wires or rods 6 equal to $\frac{1}{16}$ inch, a vertical spacing from the aerofoil surface I equal to $\frac{1}{8}$ inch, a depth or exit of nozzle 2 equal to $\frac{3}{8}$ inch and an air velocity upon issue from the nozzle of approximately 30 miles per hour, I have obtained a change in the vertical aerodynamic forces upon the aerofoil of approximately 10% as compared with the vertical component of force when no wires or rods 3 were used. Fig. 1B shows a different grouping of the wires or rods 6 wherein the first two wires rest upon the surface and the third, fourth and fifth are spaced from the surface $\frac{1}{8}$ inch, $\frac{1}{4}$ inch and $\frac{1}{2}$ inch respectively. The lateral spacing is $\frac{3}{8}$ inch for the first two spaces and $\frac{1}{16}$ inch for the second two spaces. Otherwise Fig. 1B is the same as Fig. 1A. In both figures the first rod is approximately 2½ inches from the nozzle.

The air stream or film supplied by the nozzle 2 may be supplemented by the ordinary air stream or film, assuming relative motion of the aerofoil I and the air, without substantially affecting unfavorably the controlled results effected by the arrangements shown in the drawings, and in fact when blowing in the same direction there is an advantage.

I have shown the wires or rods on the upper surface of the aerofoil I with the nozzle 2 directing the air flow over the upper surface but it is understood, of course, that they may be applied instead to the under surface or that they may be duplicated on the under surface, or the nozzle may be used by proper controls to induce flow over the under surface in conjunction with the upper. It is also understod that while I have shown the aerofoil I as of a substantially plane surface of small depth that any suitable aerofoil section or contour may be used, as for example shown in Figs. 1C and 1E. The aerodynamic characteristics of the aerofoil are under the control of the pilot at all times according to Figs. 1A and 1B. For example, it is possible to change the center of pressure of the wing by suitably grouping the wires or rods 3 and by suitably positioning and spacing them with respect to each other and the aerofoil I.

Figure 2:
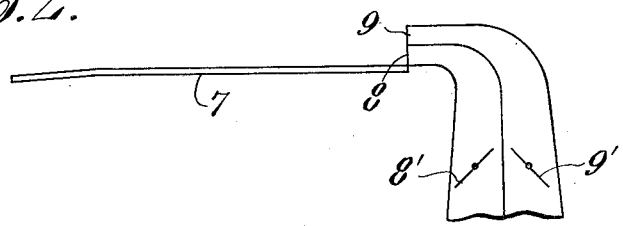

In Fig. 2 I have shown a plane aerofoil surface 7 of small depth and in this case I have shown a double straight nozzle or outlet 2' superposed upon each other, the lower outlet 8 and the upper outlet 9, and I have shown a means indicated diagrammatically at 8' and 9' for regulating and controlling the flow of air through the outlets 8 and 9. I have found that by properly regulating the flows through the outlets 8 and 9 to the surface 7 either an upward lift or a downward aerodynamic lift may be obtained. For example, with the supply outlets applied to the upper surface 7 and both outlets supplying streams of air and with substantially greater velocity through the lower outlet 8 an upward lift is produced upon the aerofoil 7; whereas with the upper outlet 9 closed and the lower outlet 8 only open a pressure or lift in the opposite direction was obtained. This was obtained by an arrangement of outlets 8 and 9 having no appreciable convergence. Thus by this arrangement the pilot may at will produce either a negative or a positive lift or vary the lift at will.

Figure 1A:
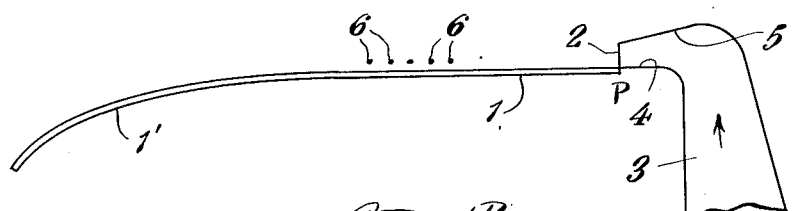
Figure 1B:
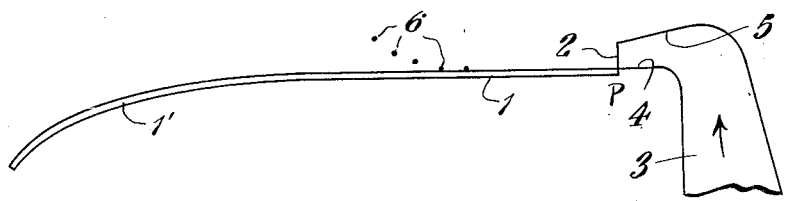
Figure 1C:
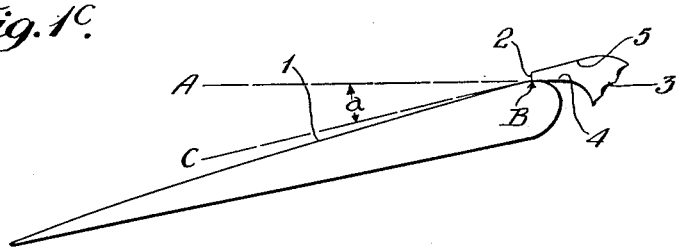
Figure 1D:
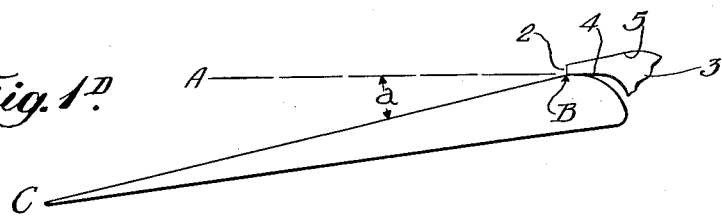
Figure 1E:
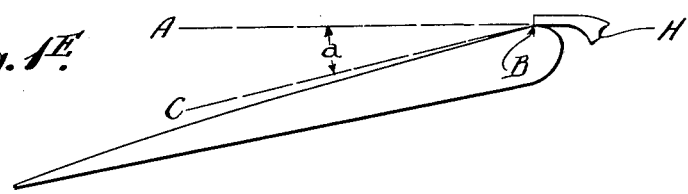
Figure 1F:
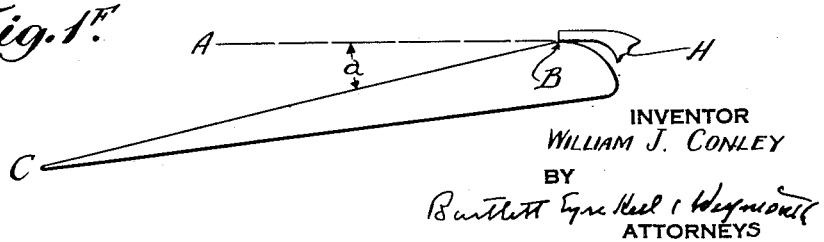

This may be utilized alone or supplemental to the lift obtained by relative air speeds of the craft as according to the arrangements of Figs. 1, 1A, 1B, 1C, 1D, 1E and 1F and if desired wires or rods 6 may be mounted upon the aerofoil 7 similarly to the arrangements shown and described in Figs. 1A and 1B for functioning with the double outlet 8 and 9. I have shown the aerofoil 7 of a plane surface and no substantial depth although it may have any contour desired and it may have any depth or aerofoil section desired. The aerodynamic lift may be regulated and controlled as above described with the simple aerofoil surfaces 1 and 7 shown without taking any advantage of any normal or standard aerofoil section. With these arrangements applied to an aerofoil section of standard form the pilot may vary the aerodynamic characteristics thereof at will to accord with any particular operating condition.

Figure 2A:
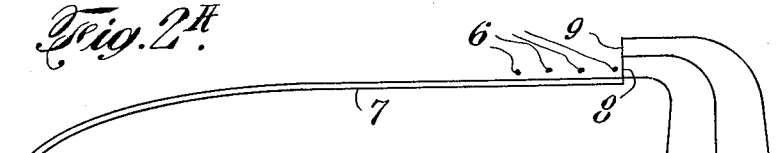
Figure 2B:
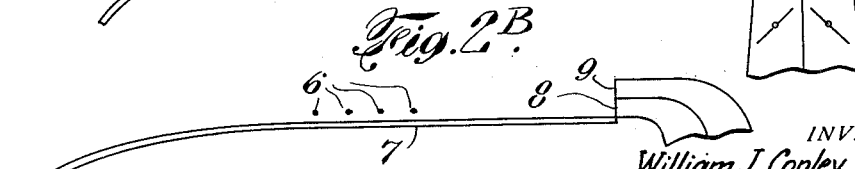

In Figs. 2A and 2B I have shown the double outlets of Fig. 2 used in conjunction with an aerofoil surface 1, similar to the aerofoil surfaces of Figs. 1, 1A and 1B, and in these figures I also utilize the groupings of the wires 6 to vary the aerodynamic characteristics of the surface. With both outlets 8 and 9 open and with a velocity in the lower outlet 8 substantially greater than the velocity of the air stream issuing from the upper outlet 9, I am able to obtain substantially different aerodynamic characteristics by the two different groupings of the wires 6 shown in Figs. 2A and 2B. In Fig. 2A the wires 6 are spaced laterally from each other approximately ½ inch and are elevated above the surface approximately ⅛ inch and the group is disposed, as indicated, very close to the double outlet 8, 9, much closer than the arrangement of Figs. 1A and 1B. In Fig. 2B the wires or rods 6 are also spaced laterally from each other approximately ½ inch and elevated above the surface approximately ⅛ inch but the group is disposed considerably further away from the outlet, namely, the first one being spaced approximately 2½ inches from the outlet.

In Fig. 3 I have shown the principle of the wire grouping and spacing as used with the single straight non-converging air supply nozzle 10, the wires being indicated at 6. Certain of the advantages of my invention are present with the wire grouping, notwithstanding the lack of convergency of the nozzle 10. Preferably the nozzle 10 is mounted so as to direct the flow of air in a direction so as to make an angle with the aerofoil surface of from 10 to 16° as shown in Figs. 1C to 1F.

Although I have shown the wires 6 as applied to only a part of the aerofoil surface it is understood that these wires may, if desired, be applied to a greater portion of the surface on either side thereof and that these wires may be segregated in groups which are spaced from each other when it is desired to obtain a particular variation of aerofoil characteristic.

The nozzles 2 and outlets 8, 9, 10 may, as above indicated, receive the air supply from blowers disposed in the craft frame or body or may receive the air from the relative air speed. In the latter case the passages leading to the nozzles are merely guide channels for guiding the relative air flow between the craft and the air to the aerofoil surfaces. Instead of double passages leading to the outlets 8 and 9 there may be a single passage with means in or in advance of the outlets 8 and 9 to regulate the flows out through these outlets.

I have indicated in Fig. 4 the application of my invention as set forth above to the control of either a lighter-than-air craft or a heavier-than-air craft. Here the longitudinal axis is indicated at A, B and the transverse axis of the craft at C, D. The lateral control surfaces are indicated at 11 and the longitudinal control surfaces are indicated at 12, only one such surface 12 being shown. By the regulation of the flow through the nozzles or outlets 13 upon the surfaces 10, 11 and 12 the pilot may produce a couple either about the longitudinal axis A, B or the transverse axis C, D for controlling the craft. This is particularly important at low relative air speeds whereby with a heavier-than-air craft the invention may be utilized to maintain the craft on an even keel while landing and getting off the ground and as applied to a lighter-than-air craft the invention puts in the hands of the pilot a means of control which is particularly useful in that type of craft, as for example, a control which is effective when the air ship is hovering or being maneuvered into a hangar. The surfaces 10, 11 and 12 of Fig. 4 are horizontal surfaces but I have shown the invention applied also to the vertical surface of fin 14 which enables the pilot to obtain a control couple at will about the vertical axis E, F of the craft.

The nozzle 13 of Fig. 4 may be identical with the nozzle 2 of Figs. 1, 1A and 1B or it may be the outlet 8, 9 or the outlet 10 above described with respect to Figs. 2, 2A, and 2B and Fig. 3 and, if desired, the wire grouping 6 may be employed on the surfaces 10, 11, 12 and 14 in conjunction with these nozzles or outlets. I have omitted, for convenience in illustration, the means for supplying and regulating the air supplied to the nozzles 13 of Fig. 4; but it is understood, of course, that any means under the control of the pilot may be employed and for this purpose any known air flow controlling means of the art may be used. It is understood also that for most efficient results the flow of air issuing from the nozzles should be caused to issue at an angle to the aerofoil surface as shown in Figs. 1C to 1F. The source of air supply with pressure may be, as described above with respect to Figs. 1, 2 and 3, a blower in the craft or may be an air stream collected from the relatively moving air.

The principle of my invention, as above indicated, is useful even with perfectly plane aerofoil surfaces, as I have demonstrated, but it also may be applied to standard aerofoil sections. I have shown, for example, one feature of the invention as applied to standard aerofoil sections indicated in Figs. 5 to 10 inclusive. Fig. 5 shows the double outlet 8, 9 mounted upon the nose of a conventional section 20 and being supplied with air through the ducts 21 and 22 respectively. Fig. 6 shows the converging nozzle 2 mounted on the nose of a standard aerofoil section 20 when being supplied by air through a duct or passage 23. Fig. 7 shows the double outlet 8 and 9 applied to the standard aerofoil section 20, but instead of being applied to the nose of the wing section was applied at a point intermediate the leading and trailing edges and directed to blow air in the direction opposite to the direction indicated in Fig. 5. Fig. 8 shows the converging nozzle 2 as applied to the standard aerofoil 20 but applied at a point intermediate the leading and trailing edges and directed to cause a film of air to be blown over the upper surface of the aerofoil section in a direction opposite to that indicated in Fig. 6. Fig. 9 shows the double outlets 8 and 9 duplicated on the standard wing section 20, one being disposed on the nose of the wing and the other being disposed intermediate to the leading and trailing edges, both being directed to blow a film of air towards the thin edge of the wing 20. Fig. 10 shows the converging nozzle duplicated in a standard wing, one being disposed in the leading edge of the wing and the other at a point intermediate the leading and trailing edges and both being directed to blow a film of air over the surface of the wing or aerofoil section in the direction of the thin trailing edge. Fig. 11 shows a double nozzle 8, 9 of Fig. 5 lowered to a point within the stream lines of the wing section to lower the resistance when the double nozzles 8 and 9 are not being used. The double outlet of Figs. 7 and 9 may be similarly constructed and arranged to be elevated for blowing the film of air over the surface or to be withdrawn to a point within the stream lines of the wing at will. Similarly the single converging nozzle 2 of Figs. 6, 8 and 10 may be so arranged and constructed as to be operable in the same way.

In Figs. 12, 13, 14 and 15 I have shown the wire grouping combined with the nozzle arrangement for supplying the film of air as applied to a standard wing section 20. Fig. 12 shows the double outlet 8 and 9 mounted in the nose of the wing. Fig. 14 shows the double outlet mounted at a point intermediate the leading and trailing edges and in both instances the double outlet directs the film of air along the surface of the wing to impinge upon the grouped wires 6. In Figs. 13 and 15 I have shown the single converging nozzle 2 mounted for blowing a film of air upon the surface and the grouped wires 6, in one instance being mounted in the nose of the wing and in the other instance at a point intermediate the leading and trailing edges and blowing in the directions indicated. Similarly as described above with respect to Figs. 5 to 11, the converging nozzle 2 and the double outlet 8, 9 may be constructed and arranged to be elevated above the aerofoil surface to blow the film of air or may be lowered within the stream line or confines of the wing to minimize resistance when not in use. The wires or rods 6 may also be arranged to be elevated up above the surface of the wing when in use or may be lowered into depressions or grooves in the wing to minimize resistance when not in use. Any suitable means for elevating and lowering these wires or rods with respect to the wing 20 may be utilized.

In Figs. 16 to 18 inclusive I have shown certain features of my invention as applied to a conventional monoplane of the low wing type wherein I have shown the film of air supplied by a nozzle or double outlet 25 mounted in the nose or leading edge of the monoplane wing, this nozzle 25 being of the single converging nozzle type or of the straight single nozzle type or of the double outlet construction described above and it is understood, if desired, that the feature of the wire groupings 6 may be employed also as set forth above. It is also understood that any of the aerofoil nozzle and/or wire arrangements of Figs. 5 to 15 may be utilized in the monoplane of Figs. 16, 16A and 16B. I have diagrammatically indicated a propeller or blower 26 for taking air through the top of the fuselage at 27 and the bottom at 28 and forcing it into a central chamber 29 into which chamber lead the distributing ducts 30 and 31 leading out outwardly to the nozzle or outlet 25 on either wing. This propeller or blower may, of course, be driven in any suitable manner, as for example by the usual power plant on the craft. For facilitating the control of the flow into the distributing ducts or chambers 30 or 31, I have indicated diagrammatically a pair of valves 30' disposed in the duct 30 and a similar pair of valves 31' disposed in the duct 31 for controlling the volume and the pressure of the air within these ducts 30 and 31.

In Figs. 19 and 20 I have shown the invention as illustrated in Figs. 16 to 18 inclusive applied to a conventional monoplane aeroplane of the high wing type and in this case I have indicated the monoplane wing surface continued rearwardly by a surface 33 which merges into the fixed tail surface 34, thereby facilitating the flow from the monoplane wing back to the tail whether artifically created from the nozzles 25 or whether created by relative air speed. The elevator flaps are indicated at 35 which in cooperation with the structure shown functions to give the necessary longitudinal control at slow speeds.

In Figs. 21, 22 and 23 I have shown my invention as applied to a conventional monoplane of the high wing type, but in this instance I have shown the nozzles or double outlets 35 as being directed to blow in a direction to supply an air stream or film in a direction transverse to the line of flight and in this case the wires 6 when employed are also extended in the longitudinal direction. This arrangement has the advantage that the fuselage may be used to contain the distributing duct for the nozzles adjacent to the fuselage while the wings may contain the distributing ducts for the nozzles further removed from the fuselage. The distribution of air to the nozzles or outlets is thereby facilitated. It also has the advantage that since the elongated nozzles and the wires extend in the longitudinal direction the air resistance due thereto is thereby minimized, it being a comparatively simple matter to streamline the ends of the ducts or the wires.

The wings 20 of Figs. 16–23, may be made airtight and filled with a lighter than air gas such as hydrogen or helium for compensation for weight.

The various nozzles for blowing or inducing the flow of a volume of air over the surfaces of the aerofoil tend to prevent turbulence of the flow of air about the surface and to promote a smooth flow of the air-stream over the aerofoil surfaces with consequent efficiency in control and lift. The same nozzles and particularly the nozzles disposed intermediate the fore and aft edges of the aerofoil may be employed to induce the flow over the aerofoil surfaces, as for example by applying an induction force along a line or lines on the upper surface of the wing at points intermediate the fore and aft edges, with the consequent prevention of tendencies to stall at steep angles, and the blowers connected with the nozzles then become induction blowers.

I claim:

1. In an aircraft, the combination of an aerofoil surface with means for causing a sheet of air to flow adjacent the surface thereof, said means including a converging nozzle and said means being arranged to cause the flow to issue from the nozzle at an angle to the surface at the point of contact of from 10 to 16°.

2. In an aircraft, the combination of an aerofoil surface with means for causing a sheet of air to flow adjacent the surface thereof, said means including a converging nozzle and said means being arranged to cause the flow to issue from the nozzle at the leading edge of the aerofoil surface and at an angle to the surface at the point of contact of from 12 to 14°.

3. In an aircraft, the combination of an aerofoil and a nozzle for supplying a jet of air to the aerofoil surface, said nozzle being juxtaposed to and disposed with respect to the surface so as to cause the jet to issue at an angle of from 10 to 16 degrees to the aerofoil surface.

4. In an aircraft, the combination of an aerofoil surface with means for causing a sheet of air to flow adjacent the surface thereof, said means including a converging nozzle and said means being arranged to cause the flow to issue from the nozzle at an angle to the surface at the point of contact of from 10 to 16°, the nozzle comprising upper and lower walls and the lower wall of the nozzle being substantially in line with that part of the aerofoil surface which is immediately adjacent and the upper wall converges thereto.

5. In an aircraft, the combination of an aerofoil surface with means for causing a sheet of air to flow adjacent the surface thereof, said means including a converging nozzle and said means being arranged to cause the flow to issue from the nozzle at an angle to the surface at the point of contact of from 10 to 16°, the nozzle comprising upper and lower walls and the lower wall of the nozzle being substantially in line with that part of the aerofoil surface which is immediately adjacent and the upper wall converges thereto at an angle of from 10 to 20 degrees.

6. In an aircraft, the combination of an aerofoil and a nozzle for supplying a jet of air to the aerofoil surface, said nozzle being juxtaposed to and disposed with respect to the surface so as to cause the jet to issue at an angle of from 10 to 16 degrees to the aerofoil surface, a group of wires being spaced along and substantially parallel to the surface and in the path of the film of air issuing from the nozzle, said wires being at an angle to the direction of movement of the film of air.

7. In an aeroplane, means for causing a film of air at a certain velocity to pass along the surface of the wing and at an angle to the direction of flight and a group of wires spaced along and adjacent and substantially parallel to said surface and disposed in the path of said film of air, said wires extending generally in the direction of flight.

8. In an aeroplane, means including a nozzle for discharging a film of air along the surface of an aerofoil surface and one or more wires juxtaposed to the surface and located intermediate the leading and trailing edges of the aerofoil and disposed at an angle to the direction of movement of said film of air and in the path thereof.

9. In an aeroplane an aerofoil, and means including a nozzle for causing a film of air to pass along the surface of the aerofoil and generally in the direction of flight and a group of wires spaced along and closely adjacent said aerofoil and located intermediate the trailing and leading edges of the aerofoil and disposed in the path of said film of air, said wires extending generally at an angle to the direction of flight.

10. The method of creating lift on an aerofoil surface which consists in supplying a sheet of air to the upper surface of the aerofoil through a nozzle in a manner to direct the flow at an angle within the range 10 to 16 degrees to the surface at the point of issuance from the nozzle.

WILLIAM J. CONLEY.